United States Patent
Stibich et al.

(10) Patent No.: US 11,161,554 B2
(45) Date of Patent: Nov. 2, 2021

(54) LIGHTWEIGHT STRUCTURAL CROSSMEMBERS

(71) Applicants: Paul R Stibich, Troy, MI (US); Steven J Engelgau, Royal Oak, MI (US); Congyue Wang, Auburn Hills, MI (US)

(72) Inventors: Paul R Stibich, Troy, MI (US); Steven J Engelgau, Royal Oak, MI (US); Congyue Wang, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 114 days.

(21) Appl. No.: 16/721,058

(22) Filed: Dec. 19, 2019

(65) Prior Publication Data

US 2020/0223495 A1    Jul. 16, 2020

Related U.S. Application Data

(60) Provisional application No. 62/790,686, filed on Jan. 10, 2019.

(51) Int. Cl.
*B62D 33/02* (2006.01)
*B62D 21/03* (2006.01)
*B62D 21/09* (2006.01)

(52) U.S. Cl.
CPC ............ *B62D 33/02* (2013.01); *B62D 21/03* (2013.01); *B62D 21/09* (2013.01)

(58) Field of Classification Search
CPC ........ B62D 21/02; B62D 21/04; B62D 21/09; B62D 25/2054; B62D 33/02

USPC ......... 296/193.1, 184.1, 187.08, 193.07, 204
See application file for complete search history.

(56) References Cited

U.S. PATENT DOCUMENTS

| | | | |
|---|---|---|---|
| 2006/0082191 A1* | 4/2006 | McNulty ............... | B62D 33/02 296/183.1 |
| 2008/0150322 A1* | 6/2008 | Shelbo .................. | B62D 33/02 296/184.1 |
| 2008/0277971 A1* | 11/2008 | Sato .................... | B62D 25/2054 296/203.04 |
| 2011/0298245 A1* | 12/2011 | Jarocki ................. | B62D 33/02 296/193.07 |
| 2015/0375801 A1* | 12/2015 | Barthelemy ......... | B62D 29/008 296/184.1 |
| 2015/0375802 A1* | 12/2015 | Courtright ............ | B21C 23/00 296/183.1 |
| 2017/0043729 A1* | 2/2017 | Courtright ............ | B60R 13/01 |
| 2017/0241134 A1* | 8/2017 | McCloud .............. | B62D 33/02 |
| 2018/0001931 A1* | 1/2018 | Higgins .............. | B62D 25/2054 |
| 2018/0257709 A1* | 9/2018 | Casali .................... | B62D 27/02 |
| 2020/0223495 A1* | 7/2020 | Stibich .................. | B62D 33/02 |
| 2020/0317277 A1* | 10/2020 | Jansma .................... | F16B 5/02 |

* cited by examiner

*Primary Examiner* — Gregory A Blankenship
(74) *Attorney, Agent, or Firm* — Ralph E. Smith

(57) ABSTRACT

A vehicle cross member has a beam with an overall U-shape cross-section. A pair of legs are connected, via rounded portions, with a web. A series of aperture is formed on the legs along a longitudinal axis of the beam. A flange is formed at a free end of the legs. The flange enables securement of the beam with a vehicle. The legs are angled with respect to one another so that the web has a width less than a width of the beam at the flange. The web has an arcuate portion along the longitudinal axis of the beam aligned with the series of apertures in the legs.

16 Claims, 4 Drawing Sheets

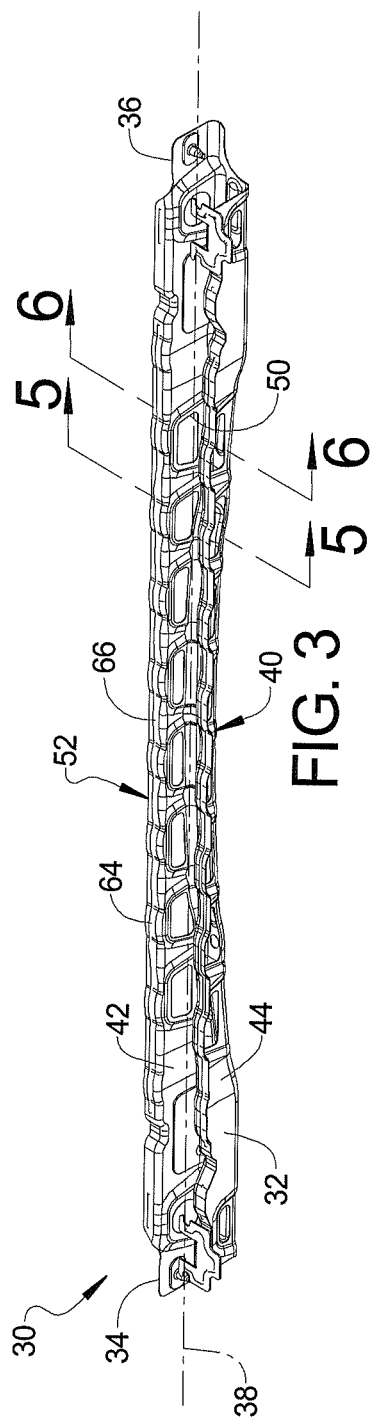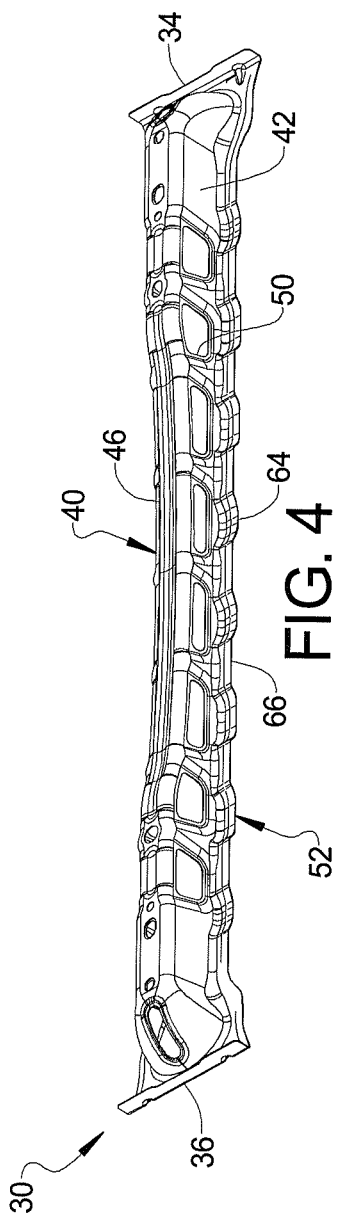

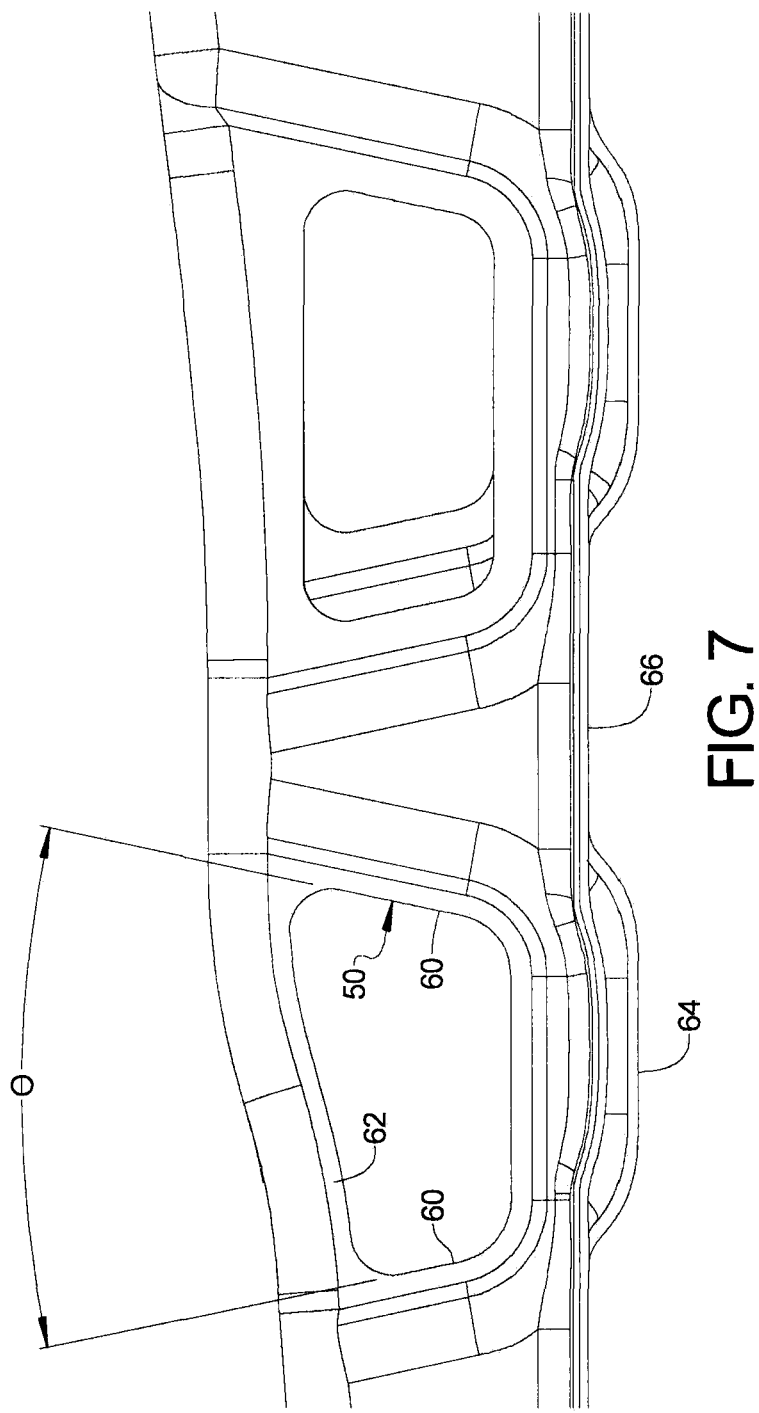

LIGHTWEIGHT STRUCTURAL CROSSMEMBERS

CROSS-REFERENCE TO RELATED APPLICATION

This application claims the benefit of U.S. Provisional Application No. 62/790,690, filed on Jan. 10, 2019, the disclosure of which is incorporated herein by reference.

FIELD

The present disclosure relates to lightweight structural crossmembers.

BACKGROUND

Traditional box crossmembers have constant sections, usually roll-formed or press-bent from thicker mild or HSLA steel. These crossmembers tend to not efficiently use mass for the required duty cycle.

Given the continuing challenges of fuel economy, there is an ever present task to reduce weight of the Body-in-White cargo box to aid in meeting these targets. In addition, the loading environment is more difficult than the previous generation cargo box requirements. While cargo box payload capacity is increased for trucks, weight targets are reduced compared to existing cargo boxes.

SUMMARY

No vehicle assembly changes were necessary, the design of the present crossmembers allowed for traditional cargo box assembly processes.

The crossmembers provide for a loading environment. This allows for a more efficient design based on the material, geometry and strategic lightening hole placement.

The higher tensile strengths of 780 TRIP and DP 780 contribute to an extended durability life of the cross member and enable a down gage of the cross member when compared to a mild or HSLA steel.

According to an aspect of the disclosure, a vehicle cross member comprises a beam having an overall U-shape cross section with a pair of legs connected via round corners with a web. A series of apertures are formed on the legs along a longitudinal axis of the beam. A flange is formed at a free end of the legs. The flange enables securement of the beam with a vehicle. The legs are angled with respect to one another so that the web has a width less than a width of the beam at the flange. The web has an arcuate portion along the longitudinal axis of the beam aligned with the series of apertures in the legs. The web has a convex portion along the arcuate portion. The convex portion is transverse to the longitudinal axis. The legs define an acute angle from the free ends to the web in a range from 1.5° to 85°. The apertures have an overall trapezoidal configuration. An angle of the minor sides of the trapezoid is about 4.5° to 85°. The flange has a corregated design with peaks and valleys for meshing with a cargo box. A stiffening flange is formed adjacent each aperture. The stiffening flange surrounds the aperture.

According to an additional aspect of the disclosure a vehicle having cargo box with a plurality of support cross members comprising a cargo box with a floor with peaks and valleys. Each of the plurality of support members comprises a beam having an overall U-shape cross section with a pair of legs connected via round corners with a web. A series of apertures are formed on the legs along a longitudinal axis of the beam. A flange is formed at a free end of the legs. The flange enables securement of the beam with a vehicle. The legs are angled with respect to one another so that the web has a width less than a width of the beam at the flange. The web has an arcuate portion along the longitudinal axis of the beam aligned with the series of apertures in the legs. The web has a convex portion along the arcuate portion. The convex portion is transverse to the longitudinal axis. The legs define an acute angle from the free ends to the web in a range from 1.5° to 85°. The apertures have an overall trapezoidal configuration. An angle of the minor sides of the trapezoid is about 4.5° to 85°. The flange has a corregated design with peaks and valleys for meshing with a cargo box. A stiffening flange is formed adjacent each aperture. The stiffening flange surrounds the aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a top perspective view of a cross member.

FIG. 4 is a bottom perspective view of a cross member.

FIG. 7 is a side elevation view of the cross member.

DETAILED DESCRIPTION

Figure 1:
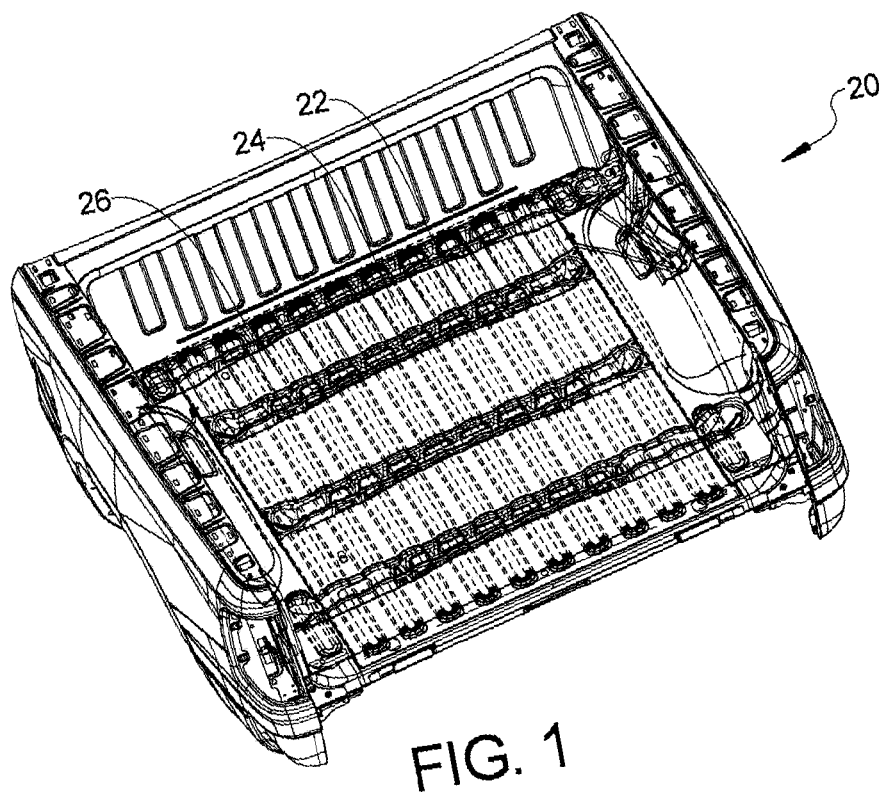
FIG. 1 is a perspective top view of a cargo box for a vehicle.
Figure 2:
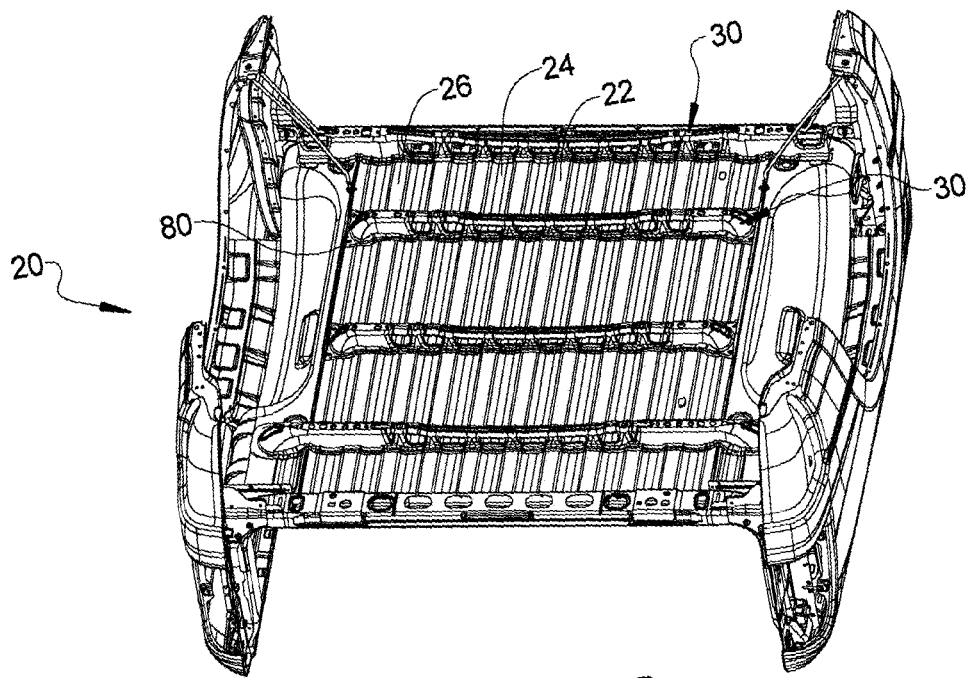
FIG. 2 is a perspective bottom view of a cargo box for a vehicle.
Figure 5:
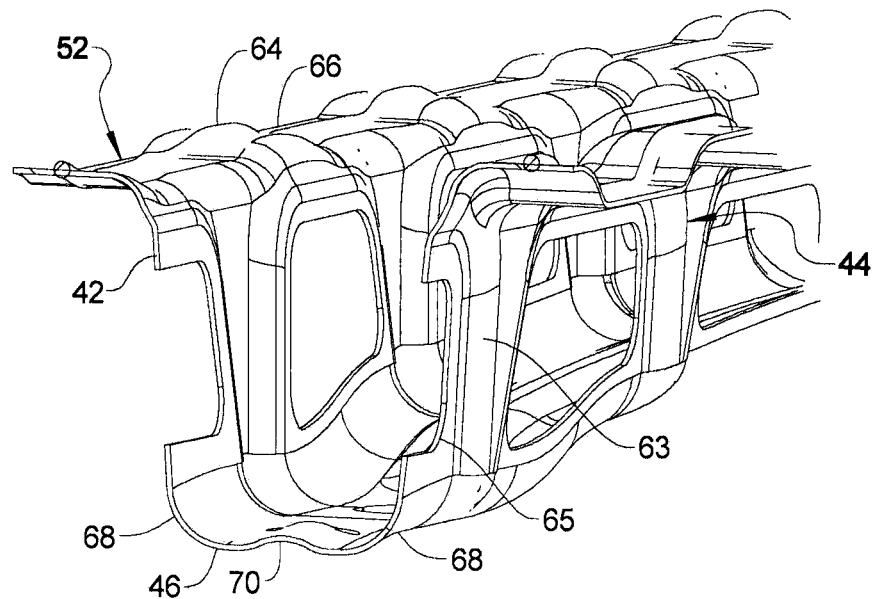
FIG. 5 is a cross-section view of line 5-5 of the cross member of FIG. 1.
Figure 6:
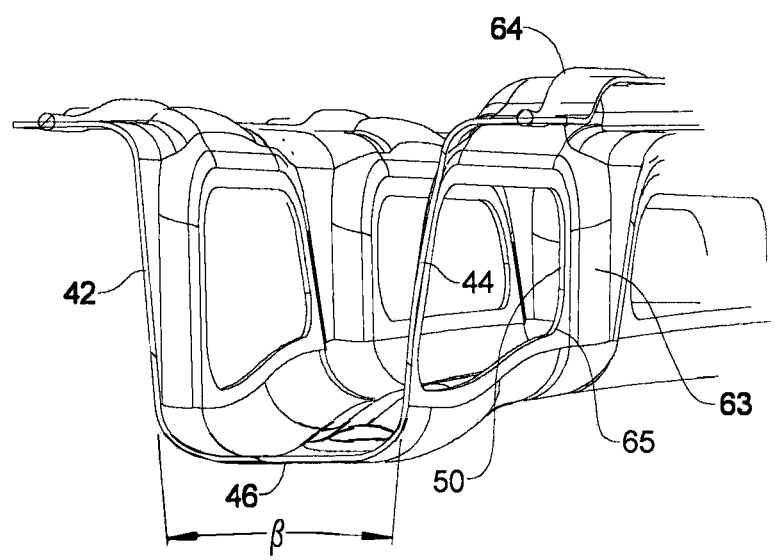
FIG. 6 is a cross-section view of line 6-6 of the cross member of FIG. 1

Turning to the figures, a vehicle, such as a truck cargo box, is illustrated and designated with the reference numeral 20. The cargo box 20 includes a bed 22 having a corregated pattern providing a plurality of peaks 24 and valleys 26. A plurality of cross members 30 are illustrated underneath the bed 22 of the cargo box 20. This enables the cross members 30 to provide strength, rigidity and secure with the vehicle frame to maintain the cargo box on the vehicle. The cross members 30 are illustrated as being four cross members having various sizes.

The cross member 30 is an elongated beam 32 with ends 34, 36 and a longitudinal axis 38. The beam 32 includes an arcuate portion 40 between the ends 34, 36. The beam 32 has an overall U-shape cross section perpendicular to the longitudinal axis 38. The beam is defined by legs 42, 44 as well as web 46. The legs 42, 44 include a plurality of apertures 50 as well as a flange 52. The apertures 50 have an overall trapezoidal shape. The minor legs 60 define an angle Θ (FIG. 7) from about 4.5° to 85°. A reinforcement portion flange 62 surrounds the aperture 50. This provides the beam 32 with additional strength.

The flange 52 is corrected with a plurality of peaks 64 and valleys 66. The peaks 64 and valleys 66 mesh with the valleys 26 and peaks 24 of the cargo bed 24, respectively. Thus, the beams 32 are positioned into the correguated configuration of the bed 22 to provide support as well as a fitment underneath the cargo bed 22.

The legs 42, 44 are connected via rounded corner portions 68 with the web 46. The round portions 68 provide for a smaller width web 46. Additionally, the web 46 includes a convex portion 70. The convex portion provides strength and stamping formability along the arcuate portion 40 of the beam 32. Also, the legs 42, 44 are angled with respect to the web 46. The legs 42, 44 are angled on an acute angle from the flange 52 to the web 46 on an angle β from about 1.5° to 85°.

Surface 63 and surface 65 are parallel, surface 65 is offset 3 mm from surface 63. This offset stabilizes the aperture during fatigue loading and inhibits crack propagation. The 3 mm offset is wrapped around the bottom of the crossmember through the lower crossmember radius.

Stabilizing hole and crack inhibitor features includes the aperture angle Θ to enable the part to form without defects. This enables it to be easily removed from the die during the die form process. The leg angle β is also included to form the part without defects. This enables it to be easily removed from the die during the die form.

The aperture and leg angles are prescribed in such a manner to stabilize or flange a hole in order to stiffen the local area during duty cycle loading. This process allows for more holes to be added to the given part yet maintain the strength and stiffness. These offset surface angles have two requirements. First, the angle of the offset surface should not exceed the plastic strain allowable for the metal selected so as not to crack or split the metal during the single forming operation. Secondly, the forming angles need to be determined to allow for the part to be removed from the tooling after only one die strike. This prevents a "die-lock" condition and allows for higher strength materials to be used in the manufacturing process. This facilitates achieving improved performance, weight savings, or both.

The basic shape without holes is stamped in the form die (also known as the draw die) which results in a single die process. The benefit is that the flanging development does not require multiple die processes to achieve the desired features. Afterwards the holes are placed in the part using a simple aerial cam process.

This design and procedure creatively allows for a flanged in a single die form process. This single step is a requirement when using Advanced High Strength Steels (AHSS) and Ultra High Strength Steels (UHSS), as well Dual Phase (DP) Steels. This single die form is required when working with the higher tensile strength steel to prevent cracking/splitting on the part itself. This process is contrasted by the multiple processes that mild steels and Aluminum are able to allow.

Advanced High Strength Steels are known in the art and are steels having tensile strengths exceeding 550 mPa. Steels having tensile strengths exceeding 780 MPa are often referred to as Ultra High Strength Steels.

Additionally, the beams 32 include a mounting tap plate 80. The plate 80 enables the beams 32 to be secured with the frame and the cargo box 20. The mounting tapping plates 80 are separate from the beam 32. The plates 80 are added to the base of the beams 32.

When forming the crossmembers the flanging of the holes required a special attention to form them in the draw die. This eliminated a downstream secondary operation which, in turn, reduced costs. The die line-up for these crossmembers is as follows: 1) form, 2) trim and cam trim, 3) cam pierce, 4) finish form, 5) re-strike, 6) cam pierce and cam trim. Separate mounting tapping plates are added to the base of the cross member. The rounded ends of the crossmembers also require attention to create a dimensionally accurate part without "splits" or "wrinkes" at high volume production line rates.

Traditional flanging geometry requires a multiple die forming process to form the flange and punch the hole. The multiple die processes does not lend itself with the use of the high strength, ultra high strength, and dual phase modern steel grades. The die formed flanging process allows for the creation of a flange in a single forming process with the hole created in a simple downstream procedures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A vehicle cross member comprising:
   a beam having an overall U-shape cross-section with a pair of legs connected, via rounded corners, with a web;
   a series of apertures formed on the legs along a longitudinal axis of the beam;
   a flange formed at a free end of the legs, the flange enabling securement of the beam with a vehicle;
   the legs being angled with respect to one another so that the web has a width less than a width of the beam at the flange; and
   the web has an arcuate portion along the longitudinal axis of the beam aligned with the series of apertures in the legs.

2. The vehicle cross member of claim 1, wherein the web has a convex portion along the arcuate portion, the convex portion being transverse to the longitudinal axis.

3. The vehicle cross member of claim 1, wherein the legs define an acute angle from the free ends to the web in a range from 1.5° to 85°.

4. The vehicle cross member of claim 1, wherein the apertures have an overall trapezoidal configuration.

5. The vehicle cross member of claim 4, wherein an angle of minor sides is about 4.5° to 85°.

6. The vehicle cross member of claim 1, wherein the flange has a corregated design with peaks and valleys for meshing with a cargo bed.

7. The vehicle cross member of claim 1, wherein a stiffening flange is formed adjacent each aperture.

8. The vehicle cross member of claim 7, wherein the flange surrounds the aperture.

9. A vehicle having a cargo box with a plurality of support cross members comprising:
   the cargo box having a floor with peaks and valleys;
   each cross member comprising a beam having an overall U-shape cross-section with a pair of legs connected, via rounded corners, with a web;
   a series of apertures formed on the legs along a longitudinal axis of the beam;
   a flange formed at a free end of the legs, the flange enabling securement of the beam with a vehicle;
   the legs being angled with respect to one another so that the web has a width less than a width of the beam at the flange; and the web has an arcuate portion along the longitudinal axis of the beam aligned with the series of apertures in the legs.

10. The vehicle cross member of claim 9, wherein the web has a convex portion along the arcuate portion, the convex portion being transverse to the longitudinal axis.

11. The vehicle cross member of claim 9, wherein the legs define an acute angle from the free ends to the web in a range from 1.5° to 85°.

12. The vehicle cross member of claim 9, wherein the apertures have an overall trapezoidal, elliptical or triangular configuration.

13. The vehicle cross member of claim 12, wherein in a trapezoidal configuration an angle of minor sides is about 4.5° to 85°.

14. The vehicle cross member of claim 9, wherein the flange has a corregated design with peaks and valleys for meshing with a truck bed.

15. The vehicle cross member of claim 9, wherein a stiffening flange is formed adjacent each aperture.

16. The vehicle cross member of claim 15, wherein the flange surrounds the aperture.

\* \* \* \* \*